(12) United States Patent
Mansour et al.

(10) Patent No.: US 8,768,358 B2
(45) Date of Patent: Jul. 1, 2014

(54) SYSTEMS AND METHODS OF BANDWIDTH ALLOCATION DURING HANDOFF

(75) Inventors: Nagi A. Mansour, Arlington, VA (US); Esmail Dinan, Herndon, VA (US); Chunmei Liu, Great Falls, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 1183 days.

(21) Appl. No.: 12/503,949

(22) Filed: Jul. 16, 2009

(65) Prior Publication Data

US 2011/0014914 A1     Jan. 20, 2011

(51) Int. Cl.
*H04W 36/00* (2009.01)

(52) U.S. Cl.
USPC ......... 455/436; 455/452.2; 370/311; 370/329

(58) Field of Classification Search
USPC ............ 455/436, 435.1, 450, 452.2; 370/311, 370/329, 331, 338
See application file for complete search history.

(56) References Cited

U.S. PATENT DOCUMENTS

| | | | |
|---|---|---|---|
| 7,373,151 B1 * | 5/2008 | Ahmed ..................... | 455/452.2 |
| 2003/0069043 A1 * | 4/2003 | Chhaochharia et al. ...... | 455/561 |
| 2005/0197126 A1 * | 9/2005 | Kang et al. .................... | 455/442 |
| 2007/0115878 A1 * | 5/2007 | Ashish et al. ................. | 370/329 |
| 2008/0045217 A1 * | 2/2008 | Kojima ......................... | 455/436 |
| 2008/0259857 A1 * | 10/2008 | Zheng ........................... | 370/329 |
| 2009/0003303 A1 * | 1/2009 | Zhu et al. ..................... | 370/345 |
| 2009/0238130 A1 * | 9/2009 | Nakatsugawa ................ | 370/329 |
| 2010/0232327 A1 * | 9/2010 | Kim et al. .................... | 370/311 |

OTHER PUBLICATIONS

R. Koodli, Ed., Fast Handovers for Mobile IPv6, Jul. 2005, http://tools.ietf.org, RFC 4068, see p. 1.*
Unsolicited, Jan. 5, 2013, Thesaurus.com, see p. 1.*

* cited by examiner

*Primary Examiner* — Mahendra Patel

(57) ABSTRACT

Systems and methods of uplink bandwidth allocation for a handoff are provided. A mobile station can transmit a handoff request message to a serving base station. The mobile station and the target base station can exchange synchronization messages and the mobile station can then subsequently receive an unsolicited allocation of a number of uplink sub-channels from the base station.

18 Claims, 5 Drawing Sheets

SYSTEMS AND METHODS OF BANDWIDTH ALLOCATION DURING HANDOFF

BACKGROUND OF THE INVENTION

Wireless communication systems are generally divided into those that are arranged for fixed mobile stations and those that allow for mobile stations. These latter types of systems employ mobility techniques to allow a mobile station to move between coverage areas by handing-over the mobile station's communications from one base station to another. There are a variety of handoff techniques, and each technique is typically defined by a particular standard being employed by the particular wireless communication system.

SUMMARY OF THE INVENTION

The terms handoff and handover are typically used by those skilled in the art to reference the transfer of a mobile station that is in an active communication from one base station to another. Thus, handoff techniques typically attempt to maintain continuity in the active communication.

It has been recognized that some handover techniques include messaging that extends the amount of time required to handover from one base station to another. In particular, it has been recognized that the messaging associated with bandwidth allocation can increase the amount of time required for handoff. Accordingly, exemplary embodiments of the present invention provide systems and method of bandwidth allocation during handoff.

An exemplary method can include transmitting, by a mobile station, a handoff request message to a serving base station. The mobile station can exchange synchronization messages with the target base station. The mobile station can receive an unsolicited allocation of a number of uplink sub-channels from the target base station.

The unsolicited allocation can be included in an uplink MAP portion of a frame. The uplink MAP portion can be included in a downlink sub-frame of the frame and the allocated number of uplink sub-channels are in an uplink sub-frame of the frame. The unsolicited allocation can be included in a handover medium access control (MAC) message. The handover MAC message can be a subscriber set basic capabilities message or a registration message. The number of uplink sub-channels can be a predetermined number of sub-channels.

The method can further include the mobile station transmitting, subsequent to receipt of the unsolicited allocation, a request for an allocation of additional uplink sub-channels, and the mobile station receiving a response to the request from the target base station. The request for allocation of additional uplink sub-channels can be transmitted subsequent to an exchange of data with the target base station. When the mobile station does not transmit in the allocated number of uplink sub-channels for a number of frames, the uplink sub-channels can be unallocated.

An exemplary method also involves a target base station receiving a handoff request message from a mobile station. The target base station can exchange synchronization messages with the mobile station. The target base station can transmit an unsolicited allocation of a number of uplink sub-channels to the mobile station.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
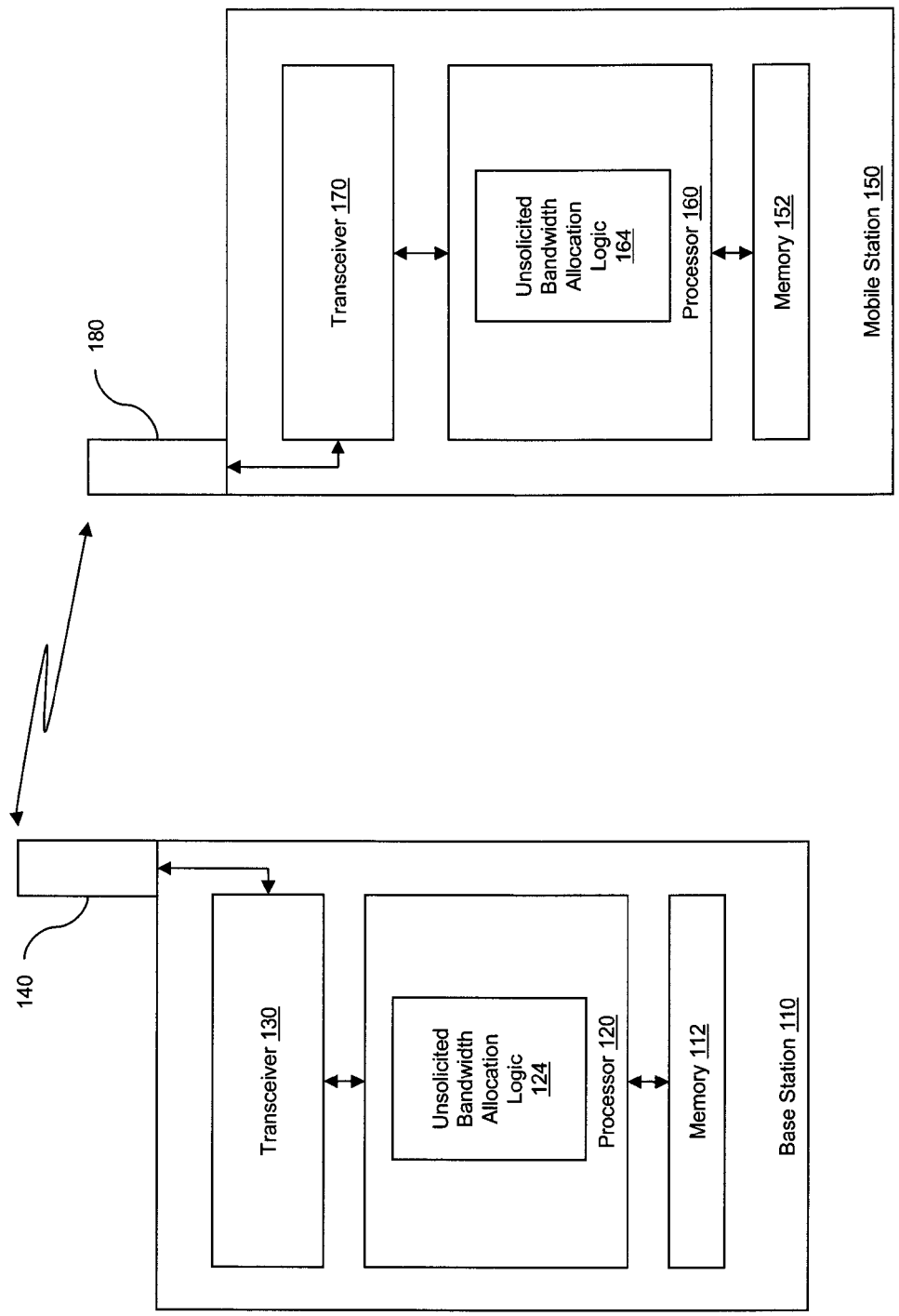
FIG. 1 is a block diagram of an exemplary base station and mobile station in accordance with the present invention.

FIG. 1 is a block diagram of an exemplary base station and mobile station in accordance with the present invention. Base station 110 communicates with mobile station 150 using wireless signals over an air interface. Base station 110 includes memory 112, processor 120, one or more transceivers 130 and one or more antennas 140. Mobile station 150 includes memory 152, processor 160, one or more transceivers 170 and one or more antennas 180. Mobile station 150 can be any type of mobile station, including, but not limited to, a wireless telephone, a personal digital assistant (PDA), a laptop computer, a desktop computer and/or the like. As will be described in more detail below, in exemplary embodiments of the present invention base stations provide unsolicited bandwidth grants to mobile stations. Accordingly, processors 120 and 160 include logic accommodating unsolicited bandwidth grants.

Processors 120 and 160 can be any type of processor, including a field programmable gate array (FPGA), application specific integrated circuit (ASIC) and/or microprocessor. When either of the processors is a microprocessor, the associated logic can be processor executable code loaded from the associated memory. Memories 112 and 152 can be any type of memory, including random access memory (RAM), read only memory (ROM), flash memory, one or more hard disks, and/or the like.

It should be recognized that FIG. 1 is a simplified block diagram and that base station 110 and mobile station 150 can include additional components beyond those illustrated. For example, mobile station 150 can include one or more display devices, one or more input devices, microphones, speakers and/or the like. Additionally, although FIG. 1 illustrates only a single mobile station communicating with the base station, the base station can support more than one mobile station. Moreover, the system can include more than one base station.

Figure 2A:
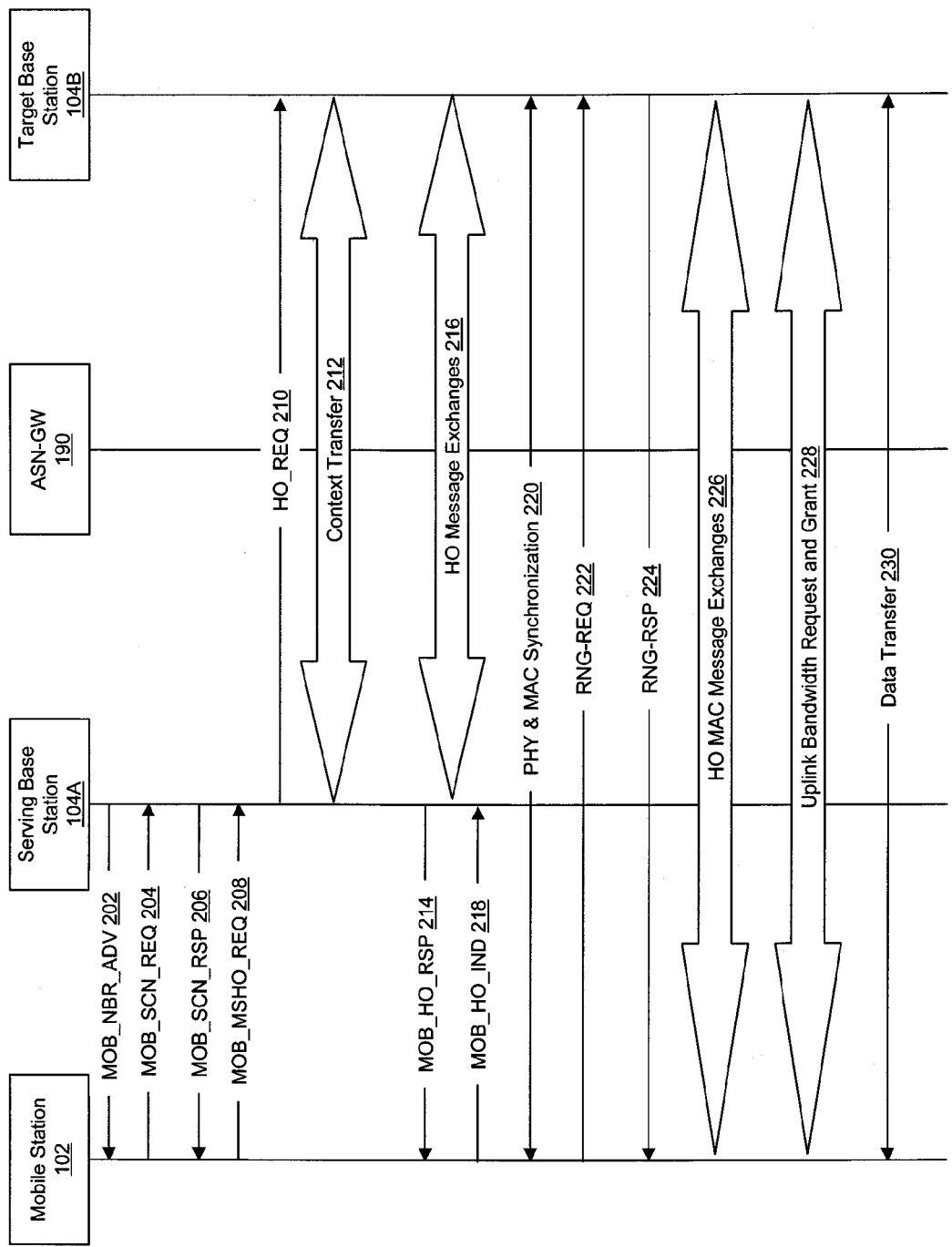
FIG. 2A is a call flow diagram for a conventional handover technique.

FIG. 2A is a call flow diagram for a conventional handover technique. The handover technique involves mobile station 102 handing-over its communications from serving base station 104A to target base station 104B. As will be appreciated by those skilled in the art, an access service network gateway (ASN-GW) is a network component used in WiMAX networks to couple base stations that are part of the access service network to the core network components, including mobility management and access, authentication and authorization (AAA) components.

Serving base station 110A periodically sends a MOB_N-BR_ADV message 202 to mobile station 150 that includes information about each neighbor base station, including physical (PHY) layer parameters, available radio resources, supported service, and the like. Mobile station 150 then sends a MOB_SCN_REQ message 204 to serving base station 110A, which responds with a MOB_SCN_RSP message 206.

Mobile station 150 then scans the neighbor base stations in order to identify a target base station for handoff. When mobile station 150 identifies one or more preferred target base stations, the mobile station sends a MOB_MSHO_REQ message 208 to serving base station 104A. This message initiates the handoff process and identifies the target base station 104B. Serving base station 104A then sends a HO_REQ message 210 to target base station 104B to notify the target base station of the initiation of the handover procedure. The serving base station and ASN-GW 190 exchange context information such as authentication keys with target base station 104B in context transfer messages 212 and HO Message exchanges 216.

Serving base station 104A then sends a MOB_HO_RSP message to mobile station 102 to instruct the mobile station to handover to the target base station 104B. Mobile station 102 then informs serving base station 104A that it will begin the handover process by sending a MOB_HO_IND message 218. Mobile station 102 also performs physical (PHY) and medium access control (MAC) layer synchronization 220 with target base station 104B. Mobile station 102 will then perform a ranging procedure with target base station 104B by sending a RNG_REQ message 222 and receiving a RNG_RSP message 224. Mobile station 102 and target base station 104B will then perform HO MAC Message Exchanges 226. Mobile station 102 will then negotiate uplink bandwidth with target base station 104B using message exchanges 228, and once the uplink bandwidth has been granted the mobile station and base station can then perform data transfer 230.

The total time between the mobile station initiating the actual handover by sending the MOB_HO_IND message 218 and beginning the data transfer is typically in the range of 50-60 msec. During this time the mobile station will not be able to send or receive data. Of the 50-60 msec, the negotiation of uplink bandwidth can take 20-30 msec. This is due to the fact that the initial bandwidth requested by the mobile station may not necessarily be granted, which would require a further bandwidth request by the mobile station. As will be described in more detail below, in order to reduce the handover interruption time exemplary embodiments of the present invention provide for an unsolicited bandwidth allocation in which a number of uplink sub-channels are allocated to the mobile station.

Figure 2B:
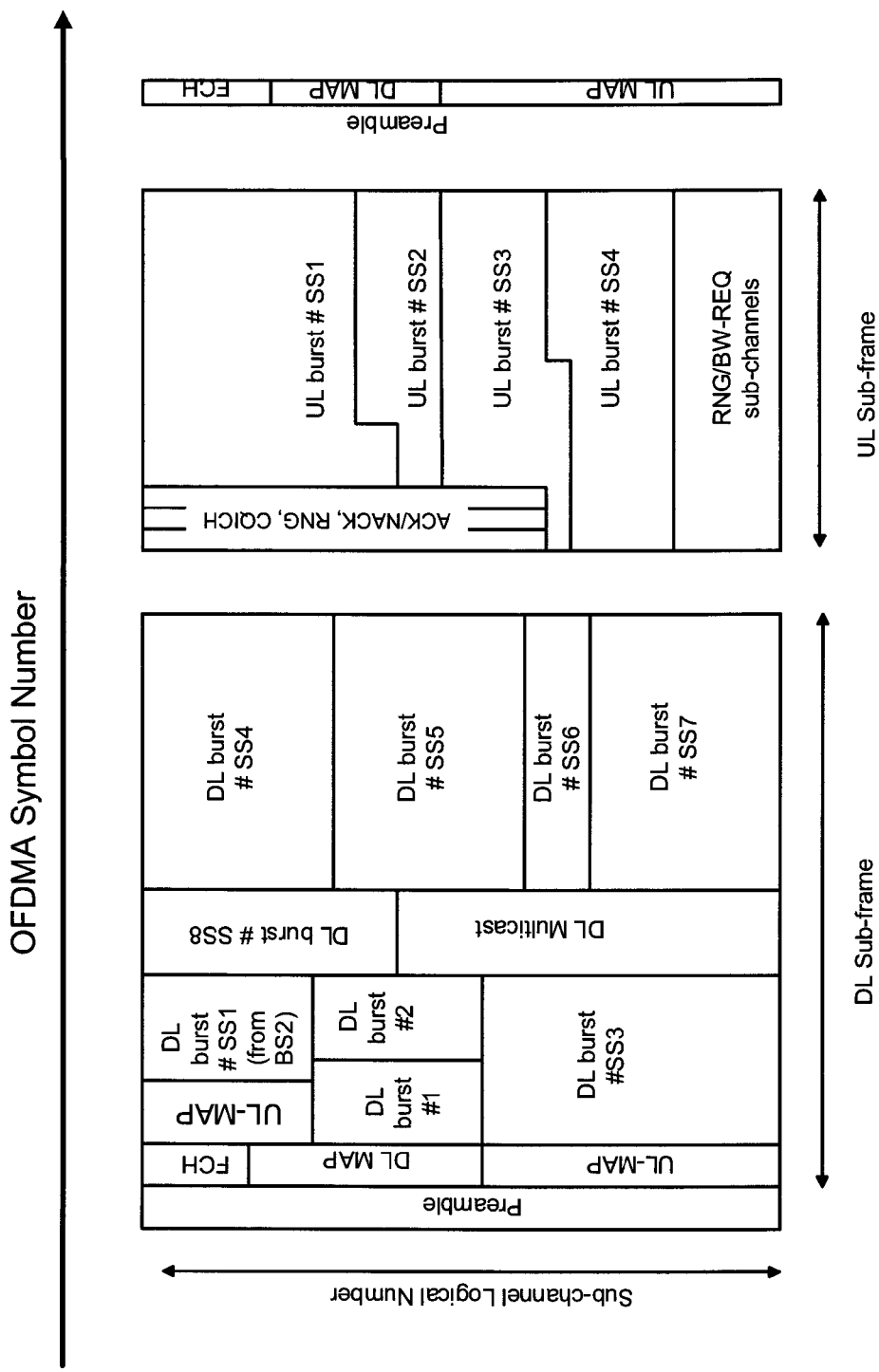
FIG. 2B is a block diagram of an exemplary frame in accordance with the present invention.

In order to appreciate one factor that affects the handover interruption time an exemplary WiMAX frame will be described in connection with FIG. 2B. As illustrated in FIG. 2B an exemplary WiMAX frame includes a downlink (DL) subframe for a base station to transmit control and other information to mobile stations, and the uplink (UL) subframe for the mobile station to transmit control and other information to the base station. Accordingly, when a message is transmitted to a mobile station in a downlink subframe that requires a response, the mobile station will transmit the message in the uplink subframe. Thus, the exchange of information related to a particular transaction between a mobile station and base station will generally be confined to one message for each of the mobile station and base station per frame. If the initial uplink bandwidth allocation requested by the mobile station is not granted, the mobile station will then have to wait until the next frame to send another bandwidth allocation request, thus increasing the handover interruption time by a minimum of two WiMAX frames. Those skilled in the art will recognize that WiMAX frames are transmitted using orthogonal frequency division multiplexing (OFDM).

Figure 3A:
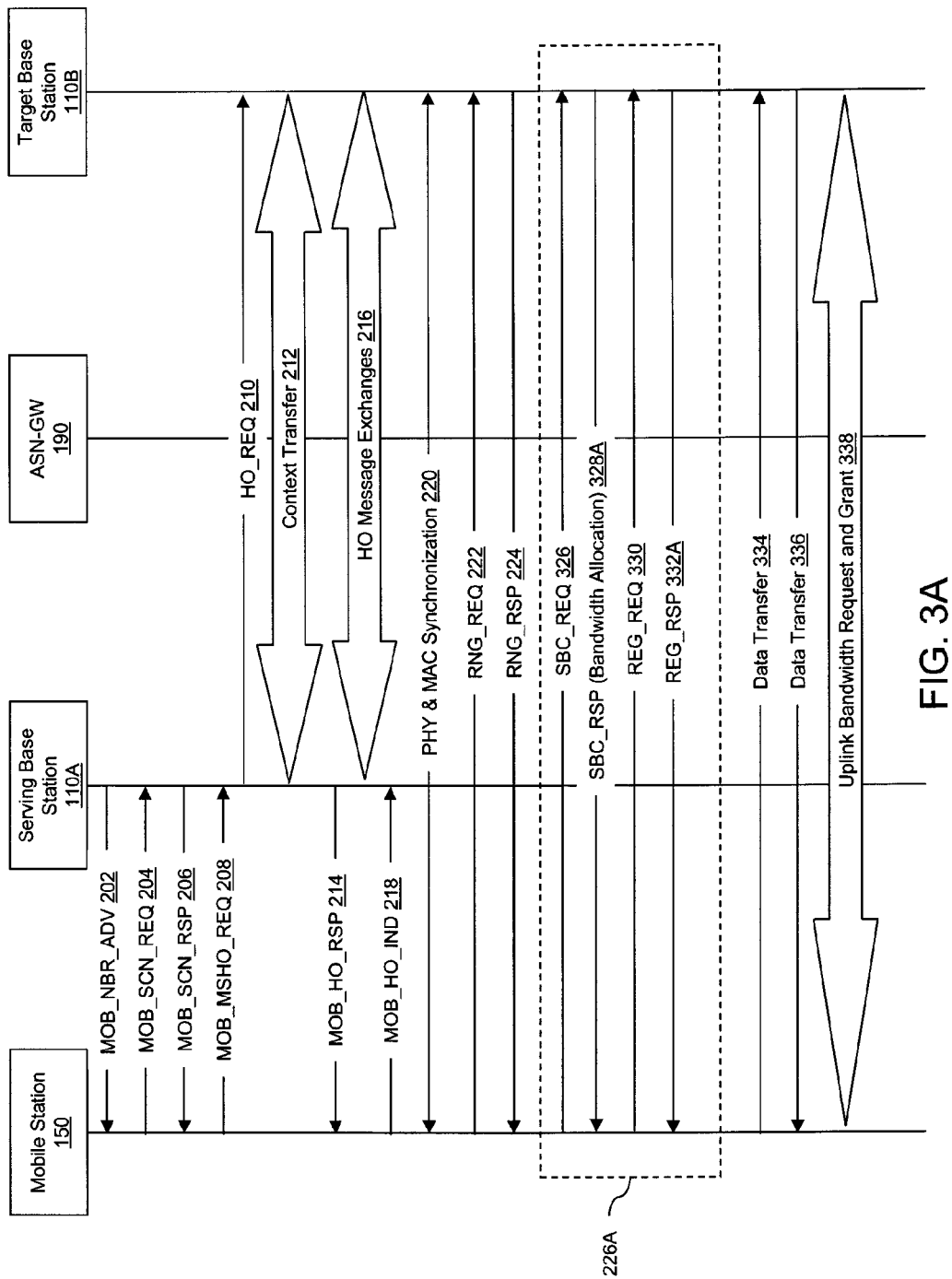
FIGS. 3A and 3B are call flow diagrams for an exemplary handover technique in accordance with the present invention.
Figure 3B:
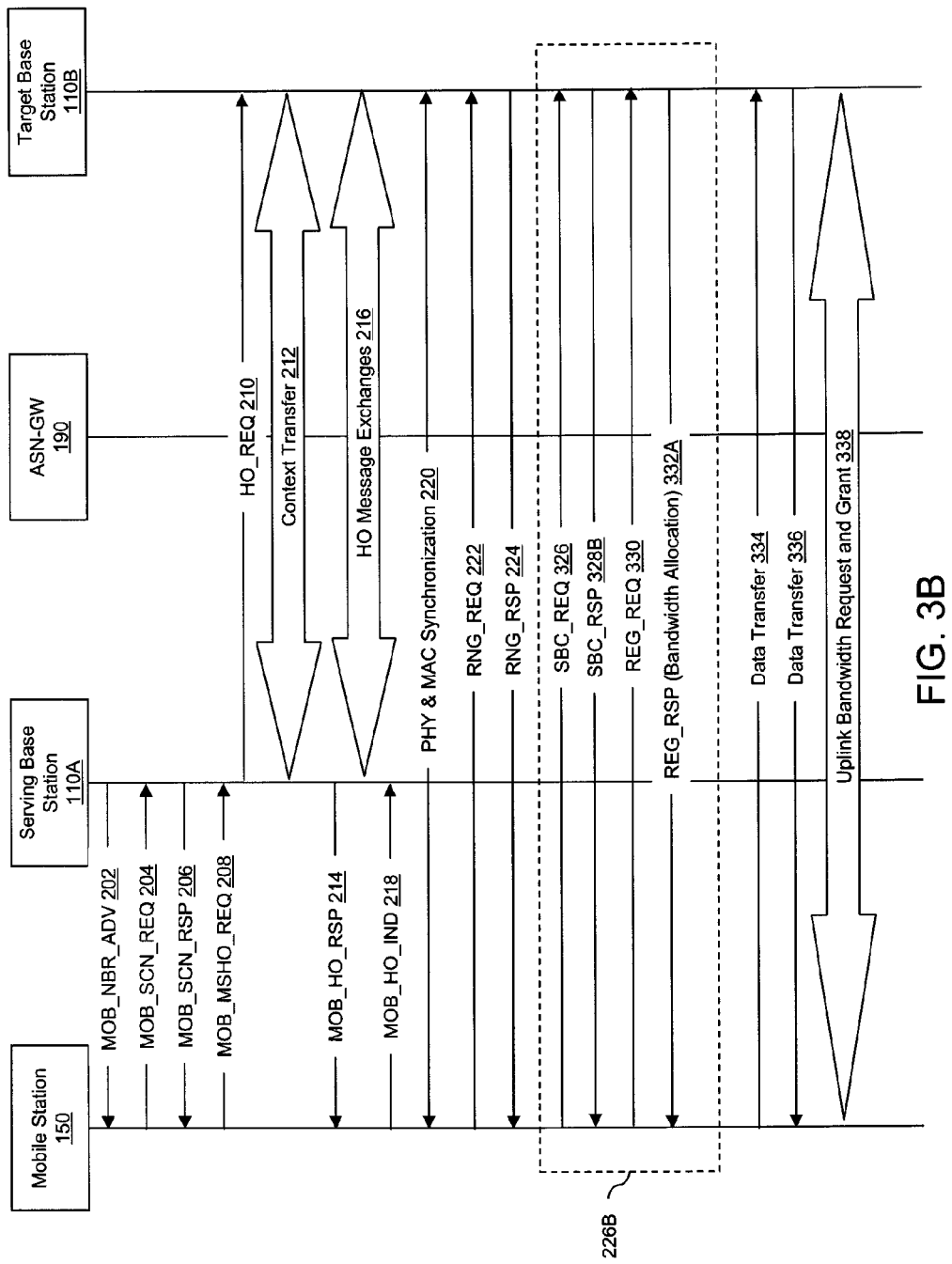

FIGS. 3A and 3B are a call flow diagram for an exemplary handover technique in accordance with the present invention. The messages 202-224 in FIGS. 3A and 3B are identical to those described above with regard to FIG. 2A, and accordingly these messages will not be described in detail further. In FIGS. 3A and 3B messages that are part of the HO MAC Message Exchanges 226A and 226B are employed to provide for the unsolicited bandwidth allocation of a number of uplink sub-channels.

Specifically, referring now to FIG. 3A, mobile station 150 sends a SBC_REQ message 326 to request the subscriber set basic capabilities and target base station 110B, using logic 124, provides the unsolicited bandwidth allocation in the SBC_RSP message 328A. The number of sub-channels that are allocated can be a predetermined number for all mobile stations that receive unsolicited bandwidth allocations. Mobile station 150 uses logic 164 to interpret the unsolicited bandwidth allocation and then sends a REG_REQ message 330 and receives a REG_RSP message 332A. Accordingly, mobile station 150 can then transfer data 334 to target base station 110B and receive a data transfers from the target base station without having to perform an uplink bandwidth negotiation. If mobile station 150 then requires additional uplink bandwidth beyond that provided by the unsolicited bandwidth allocation, an uplink bandwidth negotiation 338 can then be performed with target base station 110B. If the mobile station does not use the unsolicited allocated uplink bandwidth for a predetermined number of frames, then the bandwidth can be unallocated so that it can be assigned to other mobile stations.

The call flow of FIG. 3B is similar to that of FIG. 3A except that in FIG. 3B the unsolicited bandwidth allocation can be performed using the REG_RSP message 330 instead of the SBC_RSP message 328B.

It should be recognized that the call flow and particular messages described above is merely exemplary and that the call flow can include other messages than those specifically described. In addition, although particular messages were identified as being used to provide unsolicited uplink bandwidth allocations, other messages can be employed. For example, messages often include one or more fields that are reserved for future use. These fields can be used to provide the unsolicited uplink bandwidth allocation. Particular fields can also be repurposed to provide for the unsolicited uplink bandwidth allocation as long as both the mobile station and the base station are aware of the repurposing of the particular field.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for handover to a target base station, the method comprising:
    transmitting, by a mobile station, a handoff request message to a serving base station;
    exchanging, by the mobile station, synchronization messages with the target base station;
    receiving, by the mobile station from the target base station, an unsolicited allocation of a number of uplink sub-channels; and
    transmitting, by the mobile station to the target base station, a registration request message, wherein the unsolicited allocation is received subsequent to the exchange of synchronization messages but prior to the transmission of the registration request message, and wherein the unsolicited allocation is included in a downlink sub-frame of a frame and the allocated number of uplink sub-channels are in an uplink sub-frame of the frame.

2. The method of claim 1, wherein the unsolicited allocation is included in an uplink MAP portion of the frame.

3. The method of claim 1, wherein the unsolicited allocation is included in a handover medium access control (MAC) message.

4. The method of claim 3, wherein the handover MAC message is a subscriber set basic capabilities message.

5. The method of claim 1, wherein the number of uplink sub-channels are a predetermined number of sub-channels.

6. The method of claim 5, further comprising:
transmitting, by the mobile station subsequent to receipt of the unsolicited allocation, a request for an allocation of additional uplink sub-channels; and
receiving, by the mobile station from the target base station, a response to the request.

7. The method of claim 6, wherein the request for allocation of additional uplink sub-channels is transmitted subsequent to an exchange of data with the target base station.

8. The method of claim 1, wherein when the mobile station does not transmit in the allocated number of uplink sub-channels for a number of frames, the uplink sub-channels are unallocated.

9. A method for handover to a target base station, the method comprising:
receiving, by the target base station from a mobile station, a handoff request message;
exchanging, by the target base station, synchronization messages with the mobile station;
transmitting, by the target base station to the mobile station, an unsolicited allocation of a number of uplink sub-channels;
receiving, by the target bas station from the mobile station, a registration request message,
wherein the unsolicited allocation is transmitted subsequent to the exchange of synchronization messages but prior to the receipt of the registration request message, and
wherein the unsolicited allocation is included in a downlink sub-frame of a frame and the allocated number of uplink sub-channels are in an uplink sub-frame of the frame.

10. The method of claim 9, wherein the unsolicited allocation is included in an uplink MAP portion of the frame.

11. The method of claim 9, wherein the unsolicited allocation is included in a handover medium access control (MAC) message.

12. The method of claim 11, wherein the handover MAC message is a subscriber set basic capabilities message.

13. The method of claim 9, wherein the number of uplink sub-channels are a predetermined number of sub-channels.

14. The method of claim 13, further comprising:
receiving, by the target base station from the mobile station a request for an allocation of additional uplink sub-channels subsequent to transmission of the unsolicited allocation; and
transmitting, by the target base station to the mobile station, a response to the request.

15. The method of claim 14, wherein the request for allocation of additional uplink sub-channels is transmitted subsequent to an exchange of data with the target base station.

16. The method of claim 9, wherein when the mobile station does not transmit in the allocated number of uplink sub-channels for a number of frames, the uplink sub-channels are unallocated.

17. A method for handover to a target base station, the method comprising:
transmitting, by a mobile station, a handoff request message to a serving base station;
exchanging, by the mobile station, synchronization messages with the target base station;
transmitting, by the mobile station to the target base station, a registration request message; and
receiving, by the mobile station from the target base station, an unsolicited allocation of a number of uplink sub-channels in a registration response message,
wherein the unsolicited allocation is received subsequent to the exchange of synchronization messages, and
wherein the unsolicited allocation is included in a downlink sub-frame of a frame and the allocated number of uplink sub-channels are in an uplink sub-frame of the frame.

18. A method for handover to a target base station, the method comprising:
receiving, by the target base station from a mobile station, a handoff request message;
exchanging, by the target base station, synchronization messages with the mobile station;
receiving, by the target base station from the mobile station, a registration request message; and
transmitting, by the target base station to the mobile station, an unsolicited allocation of a number of uplink sub-channels in a registration response message, wherein the registration response message is transmitted subsequent to the exchange of synchronization messages, and
wherein the unsolicited allocation is included in a downlink sub-frame of a frame and the allocated number of uplink sub-channels are in an uplink sub-frame of the frame.

* * * * *